United States Patent
Shimizu et al.

(10) Patent No.: US 9,413,928 B2
(45) Date of Patent: Aug. 9, 2016

(54) DUST REMOVAL APPARATUS AND IMAGE PICKUP APPARATUS

(71) Applicant: CANON KABUSHIKI KAISHA, Tokyo (JP)

(72) Inventors: Yasushi Shimizu, Fujisawa (JP); Kenichi Takeda, Yokohama (JP); Toshihiro Ifuku, Yokohama (JP); Makoto Kubota, Yokohama (JP); Jumpei Hayashi, Yokohama (JP); Tatsuo Furuta, Machida (JP); Kazuki Matsushima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/685,845

(22) Filed: Apr. 14, 2015

(65) Prior Publication Data

US 2015/0304528 A1 Oct. 22, 2015

(30) Foreign Application Priority Data

Apr. 18, 2014 (JP) ................................. 2014-086678

(51) Int. Cl.
*H04N 5/228* (2006.01)
*H04N 5/217* (2011.01)
*H04N 5/225* (2006.01)

(52) U.S. Cl.
CPC ........... *H04N 5/2171* (2013.01); *H04N 5/2251* (2013.01); *H04N 5/2253* (2013.01); *H04N 5/2254* (2013.01)

(58) Field of Classification Search
CPC . H04N 5/2171; H04N 5/2251; H04N 5/2254; H04N 5/2253
USPC ......... 348/208.99, 208.1–208.8, 211.1–211.8
See application file for complete search history.

(56) References Cited

U.S. PATENT DOCUMENTS

| | | | |
|---|---|---|---|
| 6,160,458 A * | 12/2000 | Cole | ..................... H03L 1/026 331/158 |
| 2011/0297183 A1 | 12/2011 | Cameron | |
| 2012/0057066 A1 | 3/2012 | Kawai | |
| 2013/0250417 A1 | 9/2013 | Ohashi | |
| 2014/0055630 A1* | 2/2014 | Gregory | ................... G03B 3/02 348/208.2 |
| 2015/0344266 A1* | 12/2015 | Inoue | ....................... G01D 5/20 324/207.15 |
| 2016/0052826 A1* | 2/2016 | Yamazaki | ............. G01L 23/222 310/311 |

FOREIGN PATENT DOCUMENTS

| | | |
|---|---|---|
| JP | 2008-150247 A | 7/2008 |
| JP | 4790056 A | 7/2011 |
| JP | 5089065 A | 9/2012 |

* cited by examiner

*Primary Examiner* — Yogesh Aggarwal
(74) *Attorney, Agent, or Firm* — Canon U.S.A. Inc., IP Division

(57) ABSTRACT

A dust removal apparatus includes a vibrating plate, a piezoelectric element, a power supply that applies the piezoelectric element with an alternating voltage; and a control circuit that changes a frequency of the alternating voltage, in which the piezoelectric element includes first and second electrodes and a piezoelectric material, a phase transition temperature T from a first crystal phase to a second crystal phase of the piezoelectric material is $-40° C. \leq T \leq 85° C.$, the change of the frequency is for repeating a frequency sweep operation from a first frequency to a second frequency, and when a frequency at which an audible vibration is generated during the sweep operation is set as fns, a frequency at which the audible vibration is ended is set as fne, and a changing time from fns to fne during the sweep operation is set as $\Delta tn$, $\Delta tn \leq 10$ ms is satisfied.

11 Claims, 8 Drawing Sheets

DUST REMOVAL APPARATUS AND IMAGE PICKUP APPARATUS

BACKGROUND OF THE INVENTION

1. Field of the Invention

The present invention relates to a dust removal apparatus and an image pickup apparatus. In particular, the invention relates to a dust removal apparatus that removes a foreign substance such as dust attached onto a surface of an optical part that is incorporated in an image pickup apparatus such as a digital camera and an image reading apparatus such as a scanner by way of vibration and an image pickup apparatus.

2. Description of the Related Art

In an image pickup apparatus such as a digital camera that picks up an image by converting an image signal into an electric signal, an image pickup element such as a charge coupled device (CCD) or a complementary metal oxide semiconductor (CMOS) receives an image pickup light beam. Subsequently, a photoelectric conversion signal output from the image pickup element is converted into image data and recorded in a recording medium such as a memory card. A cover glass, an optical low-pass filter, an infrared absorption filter, or the like is arranged in an anterior stage (object side) of the image pickup element in the above-described image pickup apparatus.

When a foreign substance such as dust is attached onto a surface of the cover glass or the filter of these image pickup elements in the image pickup apparatus of this type, incident beam is shielded by the foreign substance and imaged as a black dot on a picked-up image in some cases. In particular, in a digital single lens reflex camera in which a lens can be replaced, dust is generated at the time of an operation of a mechanically operating part that is arranged in the vicinity of an image pickup unit such as a shutter or a quick return mirror or dust intrudes from an opening of a lens mount when the lens is replaced, and the dust may be attached onto the surface of the cover glass or the filter of these image pickup elements in some cases. In addition, the foreign substance such as the dust intrudes into a camera main body from the opening of the lens mount when the lens is replaced, and this dust may be attached in some cases. In view of the above, Japanese Patent No. 4790056 and Japanese Patent No. 5089065 disclose a dust removal apparatus including a piezoelectric element provided to the cover glass or the filter of these image pickup elements, and an elastic vibration is performed on the cover glass or the filter of these image pickup elements in a thick direction (hereinafter, will be referred to as flexural vibration) to remove the dust attached onto the surface, as well as an image pickup apparatus and an image reading apparatus including the dust removal apparatus.

Japanese Patent No. 4790056 and Japanese Patent No. 5089065 disclose the apparatus in which the piezoelectric element is provided outside an optical effective area of a rectangular optical film (an optical low-pass filter or an infrared absorption filter) and also along an end part so as to remove the dust attached onto the surface in the optical effective area by way of vibration. Japanese Patent No. 4790056 proposes a technology with which a dust control film that transmits the image pickup light beam is provided on an object side of the image pickup element, and this dust control film is vibrated by the piezoelectric element, so that the foreign substance such as the dust attached onto the surface of the dust control film is removed.

In a dust removal apparatus provided in a single lens reflex camera, a standing-wave bending vibration is generated by a driving frequency of a piezoelectric material. For example, when the piezoelectric is driven, the bending vibration is generated in a vibrating plate, and dust attached onto a surface of the vibrating plate can be effectively removed.

Lead zirconate titanate (PZT) is used as the piezoelectric material used for the dust removal apparatus that removes the dust on the image pickup element surface. However, PZT contains lead in an A-site of a perovskite structure. For that reason, an influence of a lead component on an environment is viewed as a problem. To address this problem, a piezoelectric material and a piezoelectric element using a perovskite type metal oxide that does not contain lead are proposed. For example, Japanese Patent Laid-Open No. 2008-150247 discloses barium titanate ($BaTiO_3$) as the piezoelectric material formed by a perovskite type oxide that does not contain lead.

The piezoelectric element provided in the dust removal apparatus is driven when an alternating voltage having a frequency higher than a human audible range (a frequency between 20 Hz and 20 kHz) is applied to the piezoelectric element. Vibrations at the time of the driving include a vibration for removing the dust (main vibration) and a vibration for disturbing a vibration distribution of the main vibration in a frequency range close to its resonant frequency (undesired vibration). Since a vibration mode of the main vibration is determined by a frequency of the applied voltage, sound audible to a user is not generated. On the other hand, a plurality of undesired vibrations interfere with each other in various manners, and a vibration in the audible range is generated, and the user may hear this sound as noise in some cases. The undesired vibrations are generated by various causes. For example, the main vibration is incident on an end part of the vibrating plate, a reflected wave is generated from the end part. Accordingly, the incident wave and the reflected wave interfere with each other to generate the undesired vibrations. In addition, depending on dimensions of a piezoelectric body or an electrode pattern, a vibration generated in a direction perpendicular to the main vibration may be actualized as the undesired vibration in some cases.

In the dust removal apparatus, the bending vibration generated in the vibrating plate is designed by taking into account the dimensions of the piezoelectric element and the vibrating plate (length, width, and thickness) and the material physical properties (Young's modulus, density, and Poisson's ratio). In a case where the dust removal apparatus is used under a particular environment, it is also possible to construct the dust removal apparatus having a configuration where an influence of the undesired vibration does not exist without generating the audible sound.

However, a non-lead piezoelectric material such as $BaTiO_3$ often has a phase transition temperature in an operating temperature range (between −30° C. and 50° C.), and physical property values of the piezoelectric material represented by Young's modulus largely change depending on its service temperature environment. For that reason, a machine design in which the undesired vibration is not generated in the entire operating temperature range is difficult, and a problem occurs that the large undesired vibration and the noise in the audible range (audible sound) derived from the undesired vibrations are generated depending on the temperature.

The present invention has been made in view of the above-described problem and provides a dust removal apparatus that has an excellent dust removal performance and also avoids generation of audible sound and an image pickup apparatus that can pick up a satisfactory image by using the dust removal apparatus.

SUMMARY OF THE INVENTION

A dust removal apparatus that addresses the above-described problem includes: a vibrating plate; at least one piezoelectric element provided on a surface of the vibrating plate; a power supply that applies the piezoelectric element with an alternating voltage; and a control circuit that changes a frequency of the alternating voltage, in which the piezoelectric element includes at least a first electrode, a piezoelectric material, and a second electrode, a phase transition temperature T from a first crystal phase to a second crystal phase of the piezoelectric material is in a range of −40° C.≤T≤85° C., the change of the frequency is a change for repeating a frequency sweep operation from a first frequency to a second frequency, and when a frequency at which an audible vibration is generated during the sweep operation is set as fns, a frequency at which the audible vibration is ended is set as fne, and a changing time from the frequency fns to the frequency fne during the sweep operation is set as Δtn, a relationship of Δtn≤10 ms is satisfied.

An image pickup apparatus that addresses the above-described problem includes at least the above-described dust removal apparatus and an image pickup unit, in which the vibrating plate of the dust removal apparatus is provided on a light reception surface side of the image pickup unit.

Further features of the present invention will become apparent from the following description of exemplary embodiments with reference to the attached drawings.

DESCRIPTION OF THE EMBODIMENTS

Hereinafter, exemplary embodiments of the present invention will be described in detail.

A dust removal apparatus according to an aspect of the present invention includes: a vibrating plate; at least one piezoelectric element provided on a surface of the vibrating plate; a power supply that applies the piezoelectric element with an alternating voltage; and a control circuit that changes a frequency of the alternating voltage, in which the piezoelectric element includes at least a first electrode, a piezoelectric material, and a second electrode, a phase transition temperature T from a first crystal phase to a second crystal phase of the piezoelectric material is in a range of −40° C.≤T≤85° C., the change of the frequency is a change for repeating a frequency sweep operation from a first frequency to a second frequency, and when a frequency at which an audible vibration is generated during the sweep operation is set as fns, a frequency at which the audible vibration is ended is set as fne, and a changing time from the frequency fns to the frequency fne during the sweep operation is set as Δtn, a relationship of Δtn≤10 ms is satisfied.

An image pickup apparatus according to another aspect of the present invention relates to an image pickup apparatus including at least the above-described dust removal apparatus and an image pickup unit, in which the vibrating plate of the dust removal apparatus is provided on a light reception surface side of the image pickup unit.

According to the aspects of the present invention, it is possible to provide the dust removal apparatus having the satisfactory dust removal performance without the audible sound, that is, the extremely low sound pressure level in the human audible range, by repeatedly performing the driving in which the time during which the audible sound is generated is shortened in each driving, and also provide the image pickup apparatus using the dust removal apparatus.

The dust removal apparatus according to the aspect of the present invention includes a vibrating plate and at least one piezoelectric element provided on a surface of the vibrating plate.

The dust removal apparatus is incorporated and used in an image pickup apparatus such as a digital single lens reflex camera.

Figure 2:
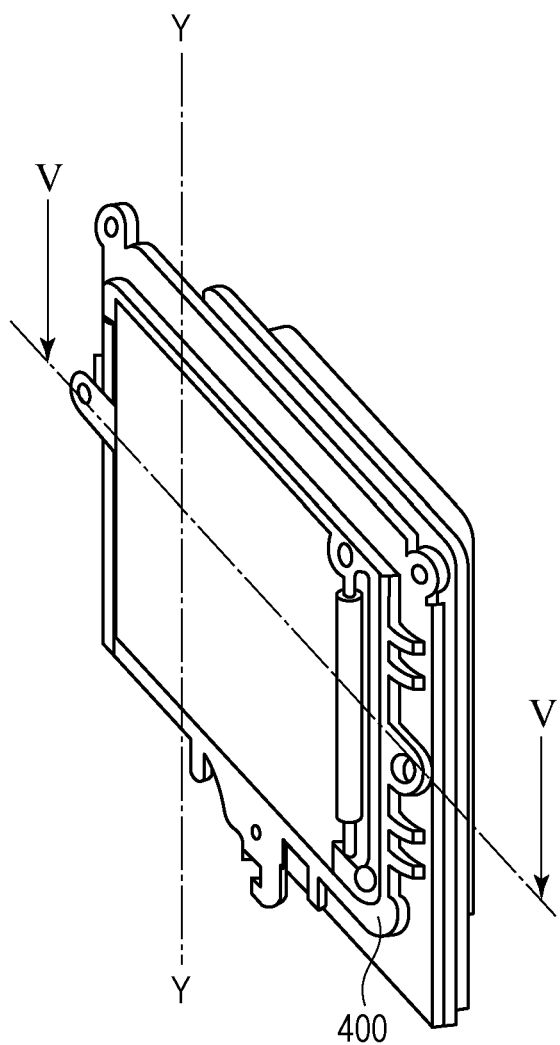
FIG. 2 is a perspective view illustrating a schematic configuration of an example of an image pickup unit provided with a dust removal apparatus which is used for an image pickup apparatus according to the exemplary embodiment of the present invention.

FIG. 2 is a perspective view of an image pickup unit 400 provided with a dust removal apparatus mounted to the digital single lens reflex camera. In FIG. 2, a V-V line indicates a horizontal direction of a central portion of an image pickup element 33a, and a Y-Y line indicates a vertical direction of the central portion of the image pickup element 33a.

Figure 4:
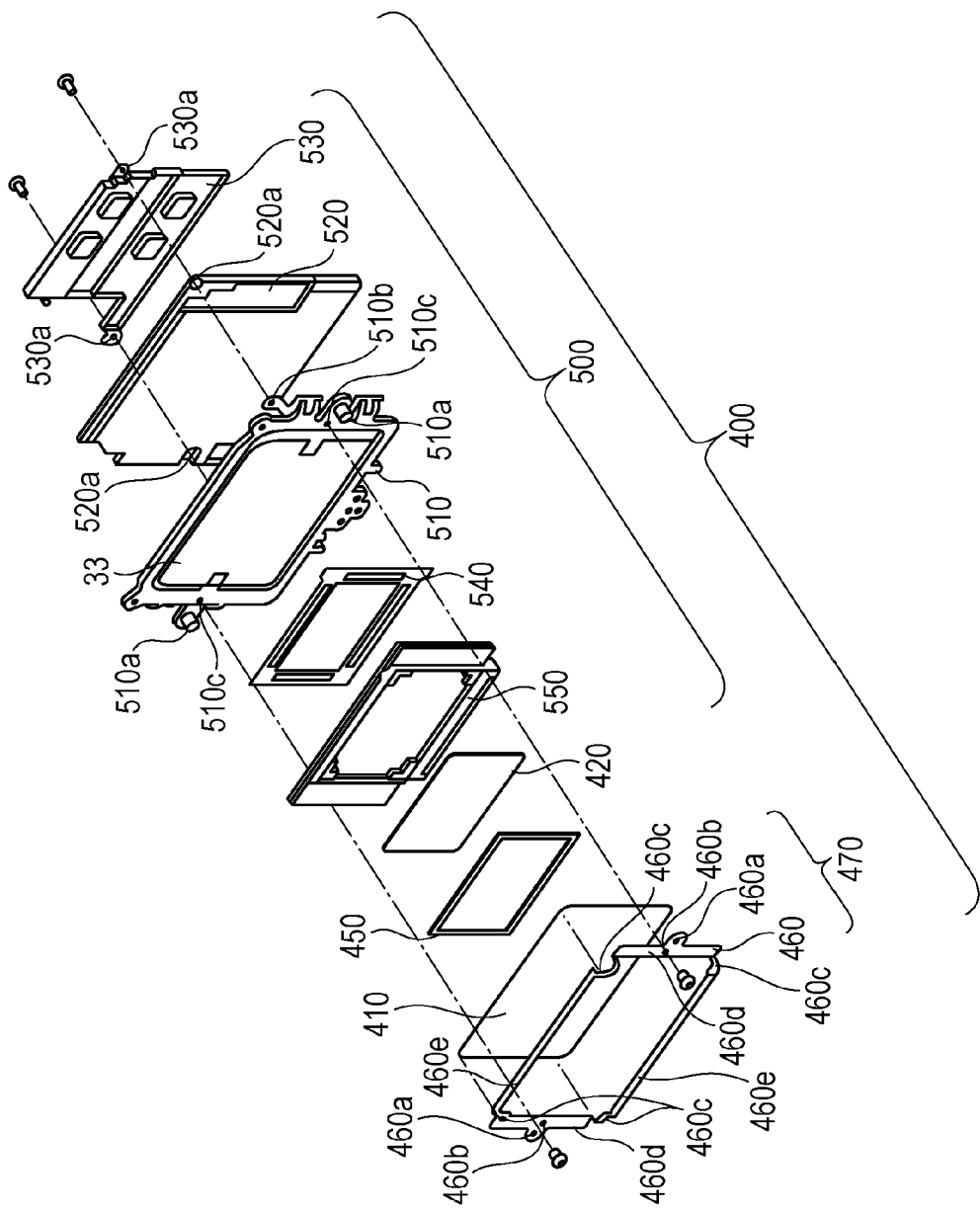
FIG. 4 is an exploded perspective view illustrating an example configuration of the image pickup unit provided with the dust removal apparatus which is used for the image pickup apparatus according to the exemplary embodiment of the present invention.

FIG. 4 is an exploded perspective view illustrating a configuration of the image pickup unit 400. The image pickup unit 400 is roughly constituted by a vibration unit 470, an elastic member 450, and an image pickup element unit 500. Although a detail will be described below, the vibration unit 470 is fixed to the image pickup element unit 500 while sandwiching the elastic member 450, and the elastic member 450 is sandwiched between a vibrating plate 410 (that also functions as an infrared ray cut filter) of the vibration unit 470 and the image pickup element unit 500.

The image pickup element unit 500 includes an image pickup element 33 and an image pickup element holding member 510 that holds the image pickup element 33 and is further constituted by a circuit substrate 520, a shield case 530, a light shielding member 540, an optical low-pass filter holding member 550, and an optical low-pass filter 420.

The image pickup element holding member 510 is formed of a metal or the like and includes a positioning pin 510a, a screw hole 510*b*, and a screw hole 510*c*. An electric circuit of an image pickup system is mounted to the circuit substrate 520, and a screw escape hole 520*a*. The shield case 530 is formed of a metal or the like and includes a screw escape hole 530*a*. The circuit substrate 520 and the shield case 530 are engaged to the image pickup element holding member 510 by screws by using the screw escape hole 520*a*, the screw escape hole 530*a*, and the screw hole 510*b*, and the shield case 530 is connected to a ground potential on the circuit to protect the electric circuit from static charge or the like.

The light shielding member 540 includes an opening corresponding to an effective area for a photoelectric conversion surface of the image pickup element 33 and is provided with adhesive layers on an object side and a photographer (user) side. The optical low-pass filter holding member 550 is fixed to a cover glass 33*a* of the image pickup element 33 via the adhesive layer provided to the light shielding member 540. The optical low-pass filter 420 is positioned at an opening location of the optical low-pass filter holding member 550 and fixed to the light shielding member 540 via the adhesive layer.

Figure 3:
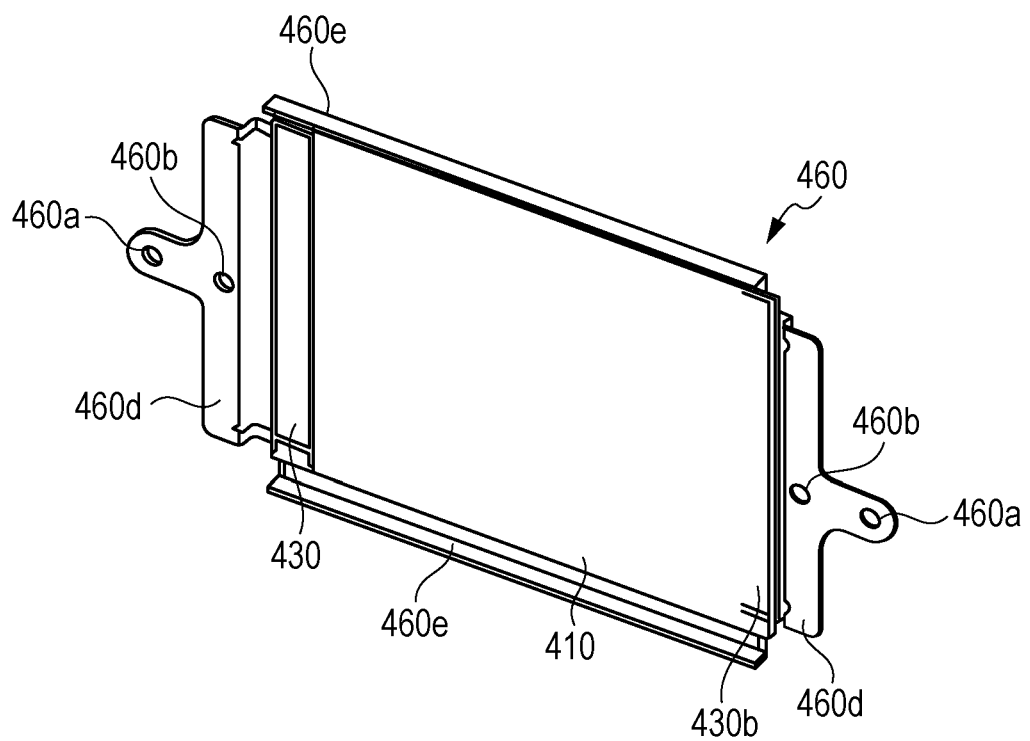
FIG. 3 is a perspective view illustrating an example relationship between a piezoelectric element and a vibrating plate used for the dust removal apparatus according to the exemplary embodiment of the present invention.

FIG. 3 is a perspective view of a holding member 460 that fixes the vibrating plate 410, to which a piezoelectric element 430 is fixed, to the image pickup element unit 500. The vibrating plate 410 may also have a function of an infrared ray cut filter.

The holding member 460 is formed as a single part by using a material having an elasticity such as a metal. The holding member 460 includes holding portions 460*c* on four corners (see FIG. 4), right and left arm portions 460*d* that connect the holding portions 460*c* to each other, and top and bottom beam portions 460*e* that connect the holding portions 460*c* to each other. The arm portions 460*d* have a vertically drawing thin plate shape at a position one step lower from a surface of the holding portions 460*c* (position on the image pickup element unit 500 side). Top and bottom ends of the arm portions 460*d* are integrally connected to the holding portions 460*c*, and bias force for biasing the vibrating plate 410 towards the image pickup element unit 500 side is generated. Positioning holes 460*a* and screw escape holes 460*b* are formed in the arm portions 460*d*. The holding portions 460*c* are fixed to the vibrating plate 410 by conductive adhesive or the like in the four corners including node portions for the vibration.

The piezoelectric element 430 is fixed to the vibrating plate 410. The piezoelectric element 430 and the vibrating plate 410 do not need to be necessarily directly contacted to each other and may appropriately have an intermediation of resin such as the adhesive, an insulating material, or a metallic material. It is however noted that, when a thickness of the adhesive or the like is thicker than 100 μm, it becomes difficult to transmit expansion and contraction of the piezoelectric element 430 to the vibrating plate 410. Thus, the thickness of the adhesive or the like is preferably 100 μm or lower and is more preferably 10 μm or lower.

The piezoelectric element 430 may be fixed at any position as long as the position is on the surface of the vibrating plate 410 where light incident on the image pickup element 33 is not shielded. In addition, although not illustrated in the drawing, the number of the piezoelectric element 430 is not limited to one, and a plurality of piezoelectric elements 430 may be used. For example, the piezoelectric elements 430 may be fixed on right and left end parts of the vibrating plate 410, or the two piezoelectric elements 430 may be fixed side-by-side. In a case where the plurality of piezoelectric elements 430 are provided, it becomes difficult to control the main vibration if six or more piezoelectric elements 430 are provided. Thus, the number of the piezoelectric elements 430 is preferably 5 or less.

The thus structured vibrating plate 410 is positioned while the positioning pins 510*a* of the image pickup element unit 500 are inserted into the positioning holes 460*a* of the holding member 460. In a state in which the positioning is in effect, the vibration unit 470 is fixed to the image pickup element unit 500 by the screws while sandwiching the elastic member 450 by using the screw escape holes 460*b* and the screw holes 510*c*. The vibrating plate 410 may be coated so as to have a conductivity. In that case, charge on the surface of the vibrating plate 410 can escape to the circuit substrate 520 via the holding member 460, the image pickup element holding member 510, and the shield case 530, so that electrostatic adhesion of the foreign substance can be avoided.

The elastic member 450 is formed of a soft material such as rubber. The elastic member 450 has a role as a vibration absorption portion of the vibrating plate 410 and also forms an enclosed space of the vibrating plate 410 and the optical low-pass filter 420 as will be described below. It is noted that, to increase a vibration absorptivity of the vibrating plate 410, the elastic member 450 is constituted by a thick member or a member having a low hardness and further preferably abuts the node portion of for the vibration of the vibrating plate 410.

Figure 5:
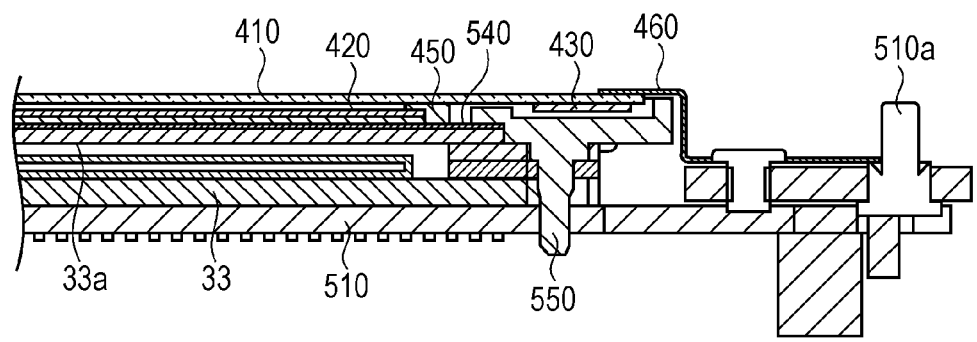
FIG. 5 is a V-V cross sectional view illustrating an example of the image pickup unit provided with the dust removal apparatus which is used for the image pickup apparatus according to the exemplary embodiment of the present invention.

FIG. 5 is a cross sectional view along a V-V line in the image pickup unit 400. A face on the object side of the light shielding member 540 abuts the optical low-pass filter 420, and a face on the photographer side abuts the cover glass 33*a* of the image pickup element 33. Adhesion layers are provided on the object side and the photographer side of the light shielding member 540, and the optical low-pass filter 420 is fixed and held by the cover glass 33*a* of the image pickup element 33 by the adhesion layer of the light shielding member 540. Accordingly, a space between the optical low-pass filter 420 and the cover glass 33*a* of the image pickup element 33 is sealed by the light shielding member 540.

That is, one face of the elastic member 450 abuts the vibrating plate 410, and the other face abuts the optical low-pass filter 420. Since the vibrating plate 410 is biased towards the image pickup element unit 500 side because of a spring characteristic of the holding member 460, the elastic member 450 is in close contact with the vibrating plate 410 without a gap, and the elastic member 450 is also similarly in close contact with the optical low-pass filter 420 without a gap. Accordingly, a space between the vibrating plate 410 and the optical low-pass filter 420 is sealed by the elastic member 450, and the enclosed space where the intrusion of the foreign substance such as the dust is avoided is thus formed.

Figure 6:
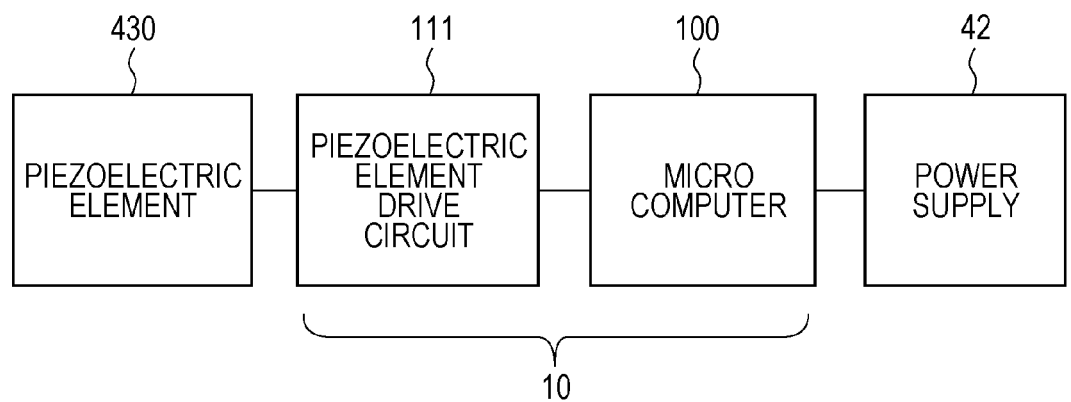
FIG. 6 illustrates an example configuration of the dust removal apparatus according to the exemplary embodiment of the present invention.

FIG. 6 is a relationship diagram illustrating an electric connection of the piezoelectric element 430, a power supply 42 that applies the piezoelectric element 430 with an alternating voltage, and a control circuit 10 that changes a frequency of the alternating voltage.

The control circuit 10 is constituted by a piezoelectric element drive circuit 111 that vibrates the piezoelectric element 430 fixed to the vibrating plate 410 and a micro computer 100 that specifies a drive voltage applied to the piezoelectric element 430 such that a vibration amplitude of the vibrating plate 410 becomes a predetermined value. A drive method for the piezoelectric element 430 will be described below.

Figure 7A:
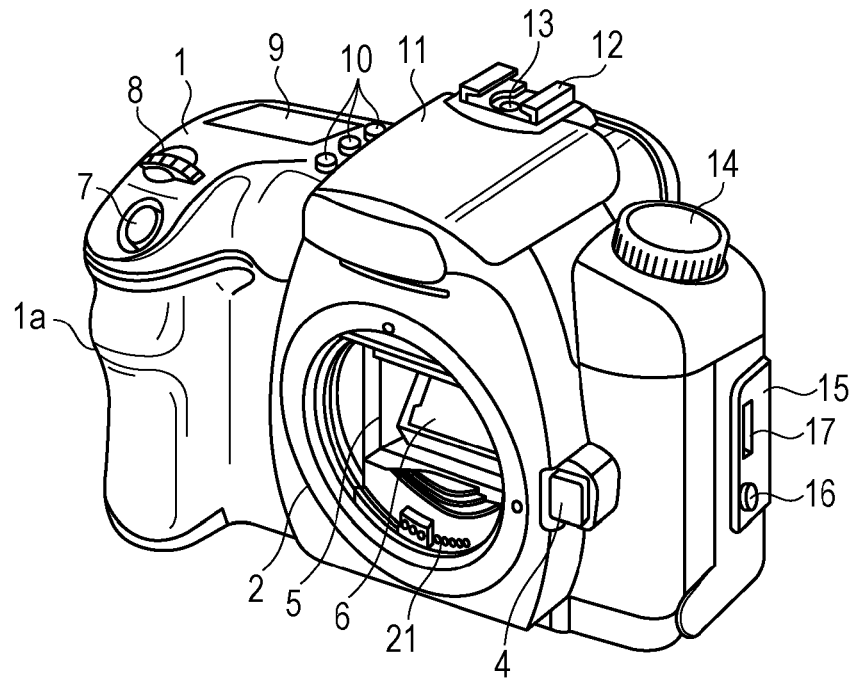
FIGS. 7A and 7B illustrate a configuration of a digital single lens reflex camera corresponding to an example of the image pickup apparatus according to the exemplary embodiment of the present invention.
Figure 7B:
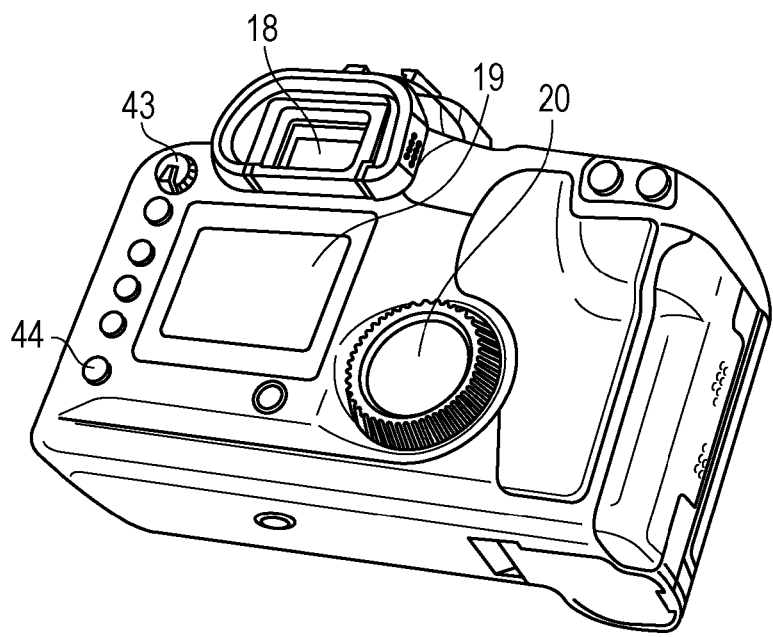

FIG. 7A and FIG. 7B are external views of the digital single lens reflex camera corresponding to an example of the image pickup apparatus according to the exemplary embodiment of the present invention. FIG. 7A is a perspective view while the camera is seen from a front side (object side) and illustrates a state in which an image pickup lens unit is removed from the camera. FIG. 7B is a perspective view while the camera is seen from a rear side (photographer side).

As illustrated in FIG. 7A, a grip portion 1a that protrudes towards the object side is provided to a camera main body 1 such that the photographer easily grips the camera at the time of image pickup. The image pickup lens unit that is not illustrated in the drawing is detachably fixed to a mount portion 2 of the camera main body 1. A mount contact point 21 enables a communication of a control signal, a status signal, a data signal, and the like between the camera main body 1 and the image pickup lens unit and also supplies power to the image pickup lens unit side. The mount contact point 21 may also be configured to enable not only an electric communication but also an optical communication, a voice communication, and the like. A lens lock release button 4 is arranged next to the mount portion 2 and is pressed when the image pickup lens unit is detached from the camera.

The camera main body 1 contains the mirror box 5 into which an image pickup light beam that has transmitted through an image pickup lens is guided, and a main mirror (quick return mirror) 6 is installed in the mirror box 5. The main mirror 6 may take a state in which the main mirror 6 is held at an angle of 45° with respect to an image pickup optical axis such that the image pickup light beam is guided in a direction of a penta-mirror (not illustrated) and a state in which the main mirror 6 is held at a position evacuated from the image pickup light beam such that the image pickup light beam is guided in a direction of the image pickup element 33 (FIG. 5). An openable and closable external terminal cover 15 is provided on a side face opposite to the grip portion 1a of the camera. A video signal output jack 16 and a USB output connector 17 are accommodated inside the opened external terminal cover 15 as external interfaces.

Figure 8:
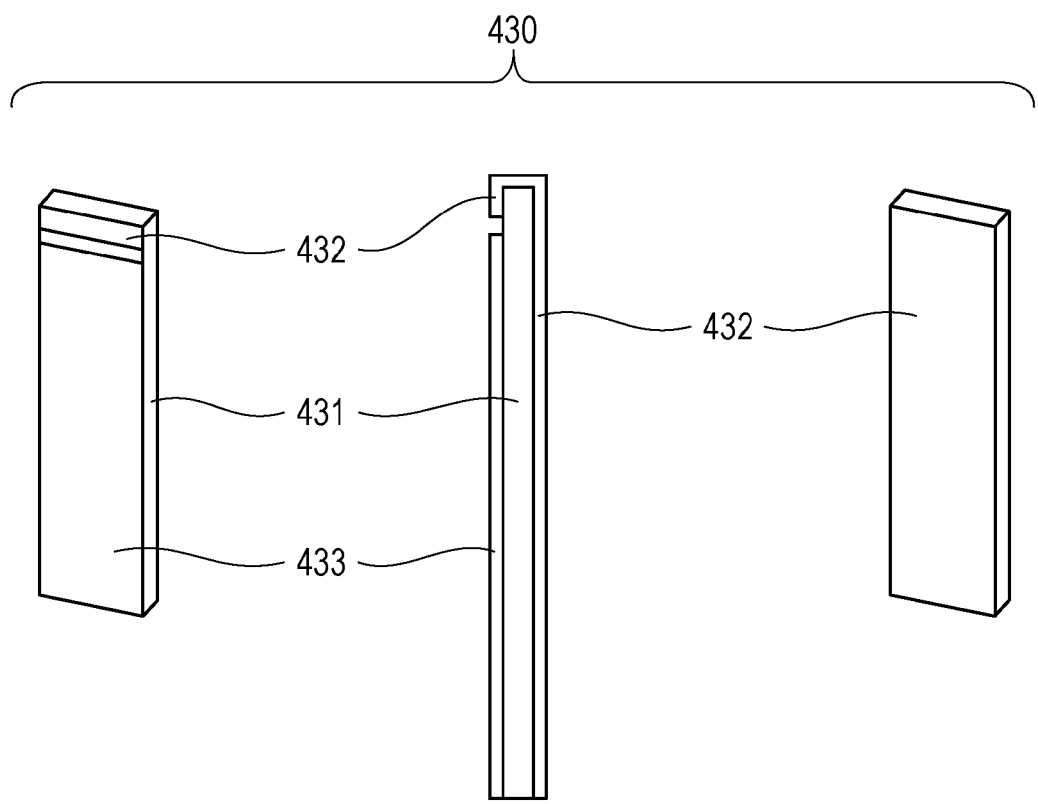
FIG. 8 illustrates an example of the piezoelectric element used for the dust removal apparatus according to the exemplary embodiment of the present invention.

FIG. 8 is a schematic diagram illustrating a configuration of the piezoelectric element 430 in FIG. 3. As described above, the plurality of piezoelectric elements 430 may be provided, but as illustrated in FIG. 8, a piezoelectric material 431 that forms the single piezoelectric element 430 is preferably formed by a single piece piezoelectric material. The single piece piezoelectric material means a piezoelectric material that is baked at the same time from a raw material having the same composition and has a uniform composition without a joint. When the joint exists, a stress concentration originating from the joint occurs, and the piezoelectric element 430 may be broken at the time of driving.

A first electrode 432 and a second electrode 433 in FIG. 8 are constituted by conductive layers having a thickness from approximately 5 nm to approximately 2000 nm. A material of the conductive layers is not particularly limited, and a material normally used for the piezoelectric element 430 may be employed. For example, a metal such as Ti, Pt, Ta, Ir, Sr, In, Sn, Au, Al, Fe, Cr, Ni, Pd, Ag, or Cu and a compound of these metals may be employed.

The first electrode 432 and the second electrode 433 may be constituted by one type among these materials or may also be constituted while layers composed of two or more types among these materials are laminated on one another. The first electrode 432 and the second electrode 433 may also be constituted by mutually different materials.

An electrode shape is not limited to a shape illustrated in FIG. 8, and an optimal electrode shape may be selected by taking into account a size of the effective area for the photoelectric conversion surface of the image pickup element 33, a member or dimensions of the vibrating plate 410, a positional relationship between the piezoelectric element 430 and the image pickup element 33, and the like.

The piezoelectric element 430 is electrically connected to the piezoelectric element drive circuit 111 by a power feeding line (not illustrated). A line generally distributed as a flexible cable can be used as the power feeding line. Although a connection can also be realized by way of adhesion by using epoxy system adhesive or the like, a method of performing thermal compression bonding on an anisotropic conductive paste (ACP) or an anisotropic conductive film (ACF) is preferably employed. The method described above is preferably employed in terms of mass-productiveness since continuity failures can be suppressed, and a process speed is improved.

Next, the piezoelectric material 431 used in the exemplary embodiment of the present invention will be described in detail.

The piezoelectric material 431 according to the exemplary embodiment of the present invention is a piezoelectric material in which a phase transition temperature T from a first crystal phase to a second crystal phase is in a range of $-40°$ C.$\leq T \leq 85°$ C.

Furthermore, the first crystal phase and the second crystal phase described above of the piezoelectric material 431 are preferably both a ferroelectric crystal phase and have a temperature (T) at which a phase transition from one ferroelectric crystal phase to the other ferroelectric crystal phase occurs.

Herein, the ferroelectric crystal phase refers to a crystal phase having a ferroelectricity and also belonging to one of seven types of crystal systems including triclinic, monoclinic, orthorhombic, hexagonal, trigonal, rhombohedral, and tetragonal.

The phase transition temperature T can be obtained, for example, from a temperature at which a dielectric constant indicates a local maximum by measuring the dielectric constant of the piezoelectric element 430 while a measurement temperature is changed by using a minute AC electric field. In general, a ferroelectric substance has a slight temperature difference between a phase transition temperature from a first ferroelectric crystal phase to a second ferroelectric crystal phase (phase transition temperature at the time of a temperature drop) and a phase transition temperature from the second ferroelectric crystal phase to the first ferroelectric crystal phase (phase transition temperature at the time of a temperature rise), but the phase transition temperature T according to the exemplary embodiment of the present invention is the phase transition temperature from the first ferroelectric crystal phase to the second ferroelectric crystal phase, that is, the phase transition temperature at the time of the temperature drop.

In general, a characteristic of the piezoelectric material largely changes in the vicinity of the phase transition temperature T of the piezoelectric material. For example, an absolute value of a piezoelectric constant $d_{31}$ having a correlation relationship with a size of the vibration amplitude of the vibrating plate 410 indicates a local maximum value at the phase transition temperature T and becomes extremely high. That is, since the phase transition temperature T of the piezoelectric material is in a range between $-40°$ C. or higher and $85°$ C. or lower corresponding to the operating temperature range for the dust removal apparatus according to the exemplary embodiment of the present invention, it is possible to obtain the dust removal apparatus having the high dust removal performance. The range of the phase transition temperature T is more preferably set as a range between $-30°$ C. or higher and $50°$ C. or lower.

A content of lead in the piezoelectric material 431 according to the exemplary embodiment of the present invention is preferably lower than 1000 ppm. In the piezoelectric element in the related art, almost all the piezoelectric materials are a piezoelectric material containing lead zirconate titanate as a main component. For this reason, it has been pointed that, for example, when the piezoelectric element is discarded to be soaked in acid rain or left in a harsh environment, the lead component in the piezoelectric material 431 is dissolved into soil, which may damage ecosystems. However, when the lead content is lower than 1000 ppm, for example, even if the piezoelectric element 430 is discarded to be soaked in acid rain or left in the harsh environment, it is not likely that the lead component in the piezoelectric material 431 damages the environment.

The lead content of the piezoelectric material 431 can be evaluated, for example, on the basis of the lead content with respect to a total weight of the piezoelectric material 431 quantified by a fluorescent X-ray analysis (XRF) or an ICP emission spectroscopy.

The piezoelectric material 431 according to the exemplary embodiment of the present invention is preferably a perovskite type metal oxide containing barium titanate as a main component. Among the piezoelectric materials that do not containing the lead components, the piezoelectric material containing barium titanate as the main component has a high absolute value d of the piezoelectric constant. Therefore, a voltage used for obtaining the same deformation amount can be set to be low. For this reason, while an environment aspect is also taken into account, the piezoelectric material 431 according to the exemplary embodiment of the present invention is preferably the piezoelectric material containing barium titanate as the main component.

According to the exemplary embodiment of the present invention, the perovskite type metal oxide refers to a metal oxide having the perovskite structure ideally corresponding to the cubical crystal structure as described in Iwanami Physics and Chemistry Dictionary, Fifth edition (Iwanami Shoten, Publishers, issued Feb. 20, 1998). The metal oxide having the perovskite structure is generally represented by a chemical formula of $ABO_3$. In the perovskite type metal oxide, elements A and B occupy particular locations in a unit lattice called A-site and B-site each in the form of ion. For example, in a cubic crystal unit lattice, an A element is located at an apex of a cube, and a B element is located at a body center. An 0 element occupies a face center location of the cube as a negative ion of oxygen.

The metal oxide represented by a general formula (1) which will be described below means that metallic elements located at the A-site are Ba and Ca, and metallic elements located at the B-site are Ti and Zr. It is however noted that parts of Ba and Ca may be located at the B-site. Similarly, that parts of Ti and Zr may be located at the A-site.

Although a molar ratio of the elements at the B-site and the O elements is 1:3 in the general formula (1), even in a case where the molar ratio is slightly fluctuated (for example, 1.00:2.94 to 1.00:3.06), if the metal oxide has the perovskite structure as a main phase, such a ratio is within the scope of the present invention.

Whether or not the metal oxide has the perovskite structure can be determined, for example, from a structural analysis based on X-ray diffraction or electron beam diffraction.

The piezoelectric material 431 according to the exemplary embodiment of the present invention preferably contains the perovskite type metal oxide represented by the general formula (1) as a main component:

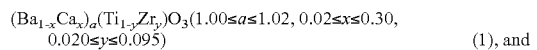
$(1)$, and the metal oxide preferably contains Mn, and a content of Mn in the metal oxide is preferably 0.02 parts by weight or higher and 0.40 parts by weight or lower in terms of metal with respect to 100 parts by weight of the metal oxide.

In the general formula (1), x indicating the molar ratio of Ca in the A-site is preferably in a range of $0.02 \leq x \leq 0.30$. When x is lower than 0.02, a dielectric loss (tan δ) may be increased in some cases. When the dielectric loss is increased, heat generated when the piezoelectric element is applied with a voltage and driven is increased, and a drive efficiency may be decreased in some cases. On the other hand, when x is higher than 0.30, the piezoelectric characteristic may not be sufficient in some cases.

In the general formula (1), y indicating the molar ratio of Zr at the B-site is preferably in a range of $0.020 \leq y \leq 0.095$. When y is lower than 0.020, the piezoelectric characteristic may not be sufficient in some cases. On the other hand, when y is higher than 0.095, Curie temperature (Tc) is lower than 85° C., and the piezoelectric characteristic may disappear at a high temperature in some cases.

In the general formula (1), a that indicates a ratio of the molar quantity of Ba and Ca at the A-site and the molar quantity of Ti and Zr at the B-site is preferably in a range of $1.00 \leq a \leq 1.02$. When a is lower than 1.00, exaggerated particle growth is facilitated, and a mechanical strength of the piezoelectric material 431 may be decreased in some cases. On the other hand, when a is higher than 1.02, the temperature used for the particle growth is too high, and the density may not become high enough in a general calciner, or a large number of pores and lattice defects may exist in the piezoelectric material 431 in some cases.

A technique for measuring the composition of the piezoelectric material 431 according to the exemplary embodiment of the present invention is not particularly limited. The fluorescent X-ray analysis, the ICP emission spectroscopy, an atomic absorption spectroscopy, or the like may be employed to measure the composition of the piezoelectric material 431. In either technique, a weight ratio and a composition ratio of the respective elements contained in the piezoelectric material 431 can be calculated.

The piezoelectric material 431 according to the exemplary embodiment of the present invention preferably is the perovskite type metal oxide represented by the general formula (1) as the main component, the metal oxide preferably contains Mn, and the Mn content is preferably 0.02 parts by weight or higher and 0.40 parts by weight or lower in terms of metal with respect to 100 parts by weight of the metal oxide.

When the metal oxide contains Mn in the above-described range, insulation properties and a mechanical quality factor Qm are improved.

Herein, the mechanical quality factor Qm refers to a factor representing an elastic loss caused by a vibration when the piezoelectric element is evaluated as a vibrator, and a magnitude of the mechanical quality factor is observed as a sharpness of a resonance curve in an impedance measurement. That is, the factor represents a sharpness of a resonance of the piezoelectric element. When the mechanical quality factor Qm is high, the deformation amount of the piezoelectric element is further increased in the vicinity of the resonant frequency, and it is possible to effectively vibrate the piezoelectric element 430.

Herein, with regard to the metal conversion indicating the Mn content, the elements constituting the metal oxide represented by the general formula (1) are converted in terms of oxide from the contents of the respective metals of Ba, Ca, Ti, Zr, and Mn measured by the fluorescent X-ray analysis (XRF), and the ICP emission spectroscopy, the atomic absorption spectroscopy, or the like from the piezoelectric material 431, and the metal conversion represents a value obtained by a ratio to the Mn weight when the total weight is set as 100.

When the Mn content is lower than 0.02 parts by weight, an effect of a polling treatment used for the driving of the piezoelectric element 430 may not be sufficient in some cases. On the other hand, when the Mn content is higher than 0.40 parts by weight, this content is not preferably set since the piezoelectric characteristic turns to be insufficient, the hexagonal structure crystal that does not contribute to the piezoelectric characteristic appears.

Herein, Mn is preferably subjected to solid solution at the B-site. When Mn is doped at the B-site, while a ratio of the molar quantity of Ba and Ca at the A-site and the molar quantities of Ti, Zr, and Mn at the B-site is set as A/B, a range of A/B is preferably $0.993 \leq A/B \leq 0.998$. Since the piezoelectric element 30 in which the ratio A/B is in the above-described range has large expansion and contraction vibrations in a longitudinal direction of the piezoelectric element 30 and also has the high mechanical quality factor, it is possible to obtain the piezoelectric element 430 having the excellent vibration performance and also the excellent durability.

In addition, the piezoelectric material 431 may contain 0.042 parts by weight or higher and 0.850 parts of by weight or lower of Bi in terms of metal with respect to 100 parts by weight of the metal oxide represented by the general formula (1). The content of Bi with respect to the above-described metal oxide can be measured, for example, by an ICP-MS composition analysis. Bi may exist in a grain boundary of the ceramic piezoelectric material or may be subjected to solid solution in a perovskite type structure of $(Ba, Ca)(Ti, Zr)O_3$. When Bi exists in the grain boundary, friction between particles is suppressed, and the mechanical quality factor is increased. On the other hand, when Bi is incorporated into the solid solution that forms the perovskite structure, the phase transition temperature is decreased. Therefore, a temperature dependency of the piezoelectric constant is decreased, and the mechanical quality factor is further improved. A position when Bi is incorporated into the solid solution is preferably at the A site because a charge balance with the above-described Mn becomes satisfactory.

Next, a preparation method for the piezoelectric material 431 used in the exemplary embodiment of the present invention will be described. A dispersion agent, a binder, a flexibilizer, or the like, and water or an organic solvent are appropriately added to a raw material powder adjusted to have a desired composition to be mixed, and a compact is prepared by way of press molding by a necessary pressure to form a high-density sintered body. Herein, in a case where the necessary pressure is not obtained only from press molding, an application of a desired pressure may be performed by way of cold isostatic press (CIP) or the like. Alternatively, a compact ingot may be prepared from the beginning by way of CIP or the like without press molding. Alternatively, a green sheet compact may be prepared in a manner that coating at a predetermined thickness in a state of slurry is performed on a supporting member such as a film by a technique such as a doctor blade method or a die coat method, and drying is performed.

Next, the ceramic sintered compact-like piezoelectric material 431 is prepared by baking the compact.

Herein, ceramics represent an aggregate (also referred to as bulk body) of crystal particles baked by thermal treatment which have the metal oxide as the basic component. That is, ceramics represent a so-called polycrystal. In addition, ceramics include processed products after sintering.

A method optimal to the desired piezoelectric material may be selected as a baking condition. The density is preferably as high as possible, and particle growth at a uniform size is preferably carried out. It is noted that baking may be performed after the compact is processed into a desired shape as appropriate.

Next, a preparation method for the piezoelectric element 430 illustrated in FIG. 8 corresponding to an example of the piezoelectric element used in the exemplary embodiment of the present invention will be described in detail.

The ceramics sintered compact-like piezoelectric material 431 prepared by the above-described method is subjected to grinding process into desired dimensions to prepare the piezoelectric material 431 having a substantially rectangular parallelepiped shape. Herein, the substantially rectangular parallelepiped shape is not limited to a hexahedron where all the planes are formed by rectangles and is basically formed by six planes, and the planes are preferably plate-like. A shape having a chipped corner or a shape having a rounded corner may also be employed. Next, as illustrated in FIG. 8, the first electrode 432 is formed on a first electrode plane of the piezoelectric element 430, and the second electrode 433 is formed on a the second electrode plane by baking of metallic paste, spattering process, a vapor deposition method, or the like.

The first electrode 432 and the second electrode 433 are preferably formed as widely as possible with respect to the surface of the piezoelectric material 431 in view of the efficiency for exciting the vibration. The formation method for the first electrode 432 and the second electrode 433 is not particularly limited. The first electrode 432 and the second electrode 433 may be formed by baking of the metallic paste or may be formed by the spattering process, the vapor deposition method, or the like. Both the first electrode 432 and the second electrode 433 may be patterned into a desired shape other than the shape illustrated in FIG. 8 and used.

The first electrode 432 may exist in a part of the second electrode plane such that the alternating voltage can be supplied to the piezoelectric element 430 only from the second electrode plane. In this case, first, the first electrode 432 is formed on the first electrode plane of the piezoelectric element 430, and the second electrode 433 and the electrically independent first electrode 432 are formed on the second electrode plane. Next, the first electrode 432 formed on the first electrode plane and the first electrode 432 formed on the second electrode plane are electrically connected to each other. A method for the electrical connection is not particularly limited, and the electrical connection may be carried out on the side face of the piezoelectric material 431 by baking of the metallic paste, the spattering process, the vapor deposition method, or the like. It is however noted that a distance between the first electrode 432 formed on the second electrode plane and the second electrode 433 is preferably as narrow as possible in a range where discharge does not occur between the electrodes in the polling treatment which will be described below.

Next, the polling treatment is performed on the piezoelectric element 430. A temperature of the polling treatment is generally set to be lower than or equal to Curie temperature Tc but is not limited to this. The polling treatment may be performed at a room temperature according to the exemplary embodiment of the present invention. A treatment time is preferably 5 minutes to 10 minutes. A treatment atmosphere is preferably in the air or in nonflammable oil such as silicone oil. Application of an electric field at 0.5 to 5.0 kV/mm is performed as a treatment voltage. The treatment voltage application may be performed at least with respect to the first electrode 432 and the second electrode 433.

The polling treatment is preferably performed before the piezoelectric element 430 is fixed to the vibrating plate 410, but the polling treatment may be performed after the piezoelectric element 430 is fixed to the vibrating plate 410.

A Young's modulus of the piezoelectric material 431 according to the exemplary embodiment of the present invention is $Y_{11}$ obtained from a calculation based on Japan Electronics and Information Technology Industries Association (JEITA EM-4501) from measurement results of a resonant frequency and an antiresonant frequency obtained by using a commercially available impedance analyzer.

Next, a driving method for the piezoelectric element 430 to perform dust removal on the surface of the vibrating plate 410 will be described. When the piezoelectric element drive circuit 111 applies a voltage at a predetermined frequency to the piezoelectric element 430 fixed to the vibrating plate 410 in accordance with a control of the micro computer 100, expansion and contraction of the piezoelectric element 430 occur in a direction perpendicular to an optical axis (planar direction of the vibrating plate 410), and the vibrating plate 410 generates an inflection vibration.

Figure 1:
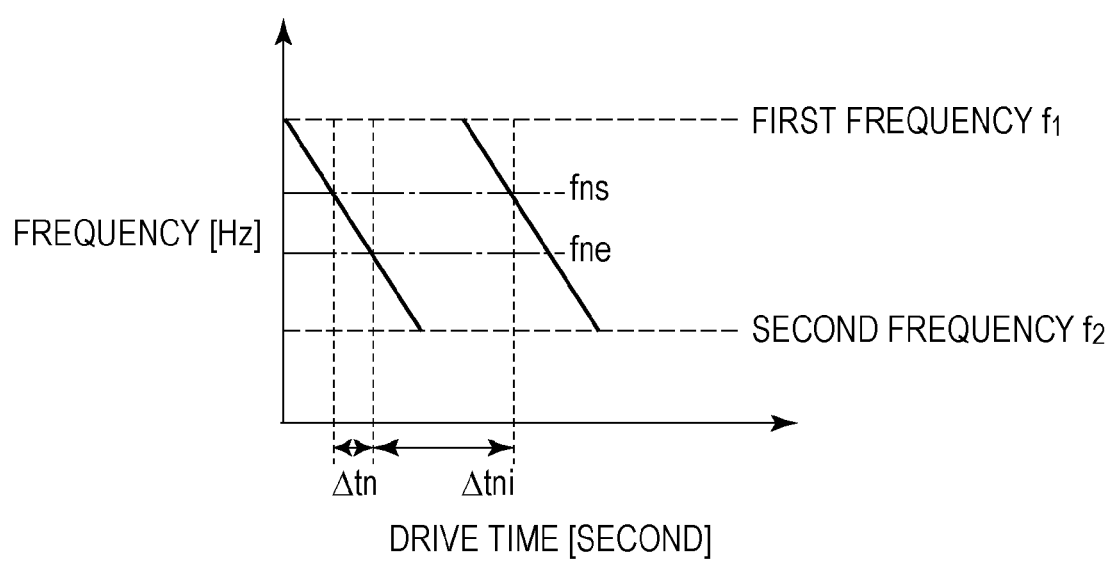
FIG. 1 illustrates a relationship between a driving frequency and a driving time of a dust removal apparatus according to an exemplary embodiment of the present invention.

FIG. 1 illustrates a relationship between the frequency change of the alternating voltage (driving frequency) applied to the piezoelectric element 430 corresponding to an example of the dust removal apparatus according to the exemplary embodiment of the present invention and a time for the application of the alternating voltage (driving time), which describes operation (sweep operation) of sequentially changing a frequency every predetermined step width from a first frequency to a second frequency.

A large amplitude can be obtained by a low voltage by setting the frequency of the alternating voltage applied to the piezoelectric element 430 in the vicinity of the resonant frequency in a specific mode of the vibrating plate 410. The resonant frequency of the vibrating plate 410 changes depending on dimensional variations of the vibrating plate 410 and the piezoelectric element 430 or the temperature. For that reason, the alternating voltage is not a constant frequency, and the application of the alternating voltage is performed in a frequency band with a sufficient width. Specifically, the application is started from a frequency (first frequency) away from the resonant frequency of the vibrating plate 410 towards a high frequency side or a low frequency side, and the sweep operation is performed gradually every step width obtained by dividing a predetermined frequency band by a predetermined number of steps in a direction of the resonant frequency at which the main vibration is generated. Then, the application is ended at a frequency (second frequency) away from the opposite side of the first frequency from the resonant frequency at which the main vibration of the vibrating plate 410 is generated. FIG. 1 corresponds to a case where a first frequency $f_1$ is higher than a second frequency $f_2$. It suffices if at least one or more resonant frequencies at which the main vibration of the vibrating plate 410 is generated exist between the first frequency and the second frequency. The step width is preferably narrower since the alternating voltage is matched with the resonant frequency, and the step width of 100 Hz or lower is more preferably set. The divided step width is not necessarily constant, and the step width may be changed during the sweep operation from the first frequency before reaching the second frequency. When the vibrating plate 410 starts the sweep operation from the frequency where the frequency of the alternating voltage is low, a response to the vibrating plate 410 may be unsatisfactory because of influences from peripheral members such as the holding member 460 and the elastic member 450, and the vibration amplitude of the vibrating plate 410 during the sweep operation towards the resonant frequency may be small in some cases. For that reason, the sweep operation from the high frequency towards the low frequency is preferably performed. That is, the first frequency is more preferably higher than the second frequency.

With regard to the alternating voltage applied to the piezoelectric element 430 to perform the dust remove, the frequency is changed at an arbitrary time in the direction from the first frequency to be closer to the second frequency, and after the frequency reaches the second frequency, the drive for changing the frequency from the first frequency to the second frequency again is repeated to perform the dust remove. A time (dormant period) during which application of a potential at 0 V is performed during the operation from the second frequency before reaching the first frequency may also be set. Effects can be attained when the repeated operation is performed at least twice or more, and the more satisfactory duct removal is performed as the number of repetitions is higher. However, since the time for performing the dust removal operation is lengthened as the number of repetitions is higher, the number of repetitions may be determined in accordance with a product specification to which the dust removal apparatus is mounted.

Next, the operation method for the vibrating plate 410 used in the digital single lens reflex camera will be specifically described. According to the exemplary embodiment of the present invention, a series of processings within the digital single lens reflex camera for performing the operation for the above-described dust removal will be referred to as dust removal mode. The vibrating plate 410 enters the dust removal mode in response to an instruction from the micro computer 100 of the digital single lens reflex camera. It is effective in terms of dust removal to automatically execute the dust removal mode at a timing immediately after the photographer performs ON operation of the power supply for the digital single lens reflex camera and the system is activated or a timing immediately before the photographer performs OFF operation to shut down the system, but the execution of the dust removal mode may be performed at a timing intended by the photographer.

A start signal of the dust removal mode is received by the micro computer 100, and a drive signal is transmitted to a drive circuit of the piezoelectric element 430. The piezoelectric element drive circuit 111 generates the alternating voltage at which the flexural vibration is generated on the vibrating plate 410, and the piezoelectric element 430 is applied with the alternating voltage via the power feeding line. It is noted that a waveform of the alternating voltage may be any one of forms including a rectangular wave, a sine wave, a triangular wave, and a saw-tooth waveform.

For measurement of sound (including sound outside the audible range) generated when the dust removal apparatus is driven, a sound pressure level can be obtained by analyzing recorded data by a general frequency analyzer (for example, SA-02M manufactured by RION Co., Ltd.) or an external microphone connected to the digital single lens reflex camera or the like. In particular, according to the exemplary embodiment of the present invention, a standard method corresponds to measurement using a measurement microphone installed at a position several cm away from the plane of the vibrating plate 410 in the vertical direction in the state of the image pickup unit illustrated in FIG. 2.

When the driving is performed under a condition where an absolute value of a speed average of the frequency change of the alternating voltage applied to the piezoelectric element

430 is $1\times10^5$ Hz/second or lower, a sound pressure level (A-weighted sound pressure level) on which an A-weighted correction defined by Japan Industrial Standard (JIS C 1502-1990) for a normal sound level meter in the frequency range between 20 Hz and 20 kHz corresponding to the human audible range is measured as the sound pressure level according to the exemplary embodiment of the present invention. Herein, the A-weighted sound pressure level refers to a frequency weighted characteristic taking a human auditory characteristic in which a magnitude of sound sensed by a person varies depending on a frequency even in the case of the physical same sound pressure into account, which is defined by Japan Industrial Standard described above. A frequency of the alternating voltage when audible sound at −10 dB or higher at the A-weighted sound pressure level is detected is set as a frequency fns at which the audible vibration is generated (audible vibration starting frequency) during the sweep operation, and the frequency of the alternating voltage when the audible sound is not detected is set as a frequency fne at which the audible vibration is ended (audible vibration ending frequency) during the sweep operation. A changing time from fns to fne is set as $\Delta$tn. $\Delta$tn changes depending on a speed of the change of the driving frequency, but fns and fne do not change. When the repeated application of the alternating voltage from the first frequency to the second frequency is performed, a time from the end of $\Delta$tn until when the frequency becomes fns for the next time is set as $\Delta$tni.

According to the exemplary embodiment of the present invention, the A-weighted sound pressure level averaged over the time while the audible sound is detected is set as the sound pressure level of the audible sound. It is found out from the study conducted by the inventors of the present invention that, when $\Delta$tn is shorter than or equal to 10 ms, the audible sound generated in a state in which the image pickup unit 400 is installed in the digital single lens reflex camera becomes lower than or equal to an acceptability limit, and it is possible to provide the dust removal apparatus with no audible sound. The changing time $\Delta$tn from fns to fne during the sweep operation described above is preferably $\Delta tn \leq 3$ ms.

In a case where a vibration frequency of an acoustic wave of the audible sound generated during the application of the alternating voltage from fns to fne (acoustic wave frequency) is set as fh, and fh is a frequency that is lower than or equal to 500 Hz, for example, the slight audible sound may be detected in some cases even when $\Delta$tn is shorter than or equal to 10 ms. For that reason, $\Delta$tn is further preferably set as a time shorter than or equal to one period of fh. That is, $\Delta$tn further preferably satisfies a relationship of $\Delta tn \leq 1/fh$. When $\Delta$tn is lower than or equal to 1/fh, a time during which the audible sound is generated becomes shorter than or equal to a period of the audible sound (inverse number of the frequency of the audible sound), and it is possible to further suppress the sound pressure level. The actually measured audible sound may be mixed with a plurality of sounds having mutually different frequencies in some cases, but according to the exemplary embodiment of the present invention, a frequency at which the highest sound pressure level in the audible frequency range is set as fh.

A frequency at which the vibration for removing the dust is generated is also included between fns and fne. Therefore, if such driving that $\Delta$tn is simply shortened is performed, the time during which the vibration for removing the dust is generated is shortened, and the dust removal performance is decreased. To suppress the noise while the dust removal performance is maintained, the drive for obtaining $\Delta$tn described above is repeatedly performed plural times (twice or more), so that the dust removal apparatus in which the audible sound is small and also has the satisfactory dust removal performance can be obtained. To obtain the dust removal apparatus in which the audible sound is small, and also the satisfactory dust removal can be performed, an absolute value of the average of the speed for changing the frequency, that is, a changing speed Vf of the audible vibration during the sweep operation in $\Delta$tn is represented by |fns−fne|/$\Delta$tn, and the changing speed Vf of the audible vibration is preferably set to be higher than or equal to $5\times10^5$ Hz/second and lower than or equal to $3\times10^6$ Hz/second.

The time $\Delta$tni from the time for the application of fne described above (from the end of $\Delta$tn) until when the frequency becomes fns for the next time is preferably prepared because the audible sound becomes the intermittent sound, and the sound pressure level of the audible sound is set to be low. In a case where the first frequency and fns, and the second frequency and fne are sufficiently away from each other, the sweep operation itself at the frequency at which the vibration is generated does not necessarily need be discontinuous, and the frequency may be immediately turned from the second frequency to the first frequency. That is, in a case where the first fne for driving the piezoelectric element 430 is temporally close to the next fns, the time from the first frequency for the first time until when the vibration for generating the audible sound attenuates in the drive at the second frequency overlaps with the audible sound generated in the similar drive for the second time. For that reason, even when the highest value of the sound pressure level does not change in the above-described driving for the first time and the driving for the second time, because of an influence from the overlap of the audible sounds for the first time and the second time, the average sound pressure level becomes higher than the sound pressure level in a case where the audible sounds for the first time and the second time are not overlapped with each other. From the study of the inventors of the present invention et al., a relationship of $\Delta tni \geq 2\Delta tn$ is further preferably satisfied by taking the attenuation of the generated vibration for generating the audible sound into account since the sound pressure level can be set to be lower.

In addition, plural sets of fns and fne may also exist during the single sweep operation from the first frequency to the second frequency. In that case, the relationship among $\Delta$tn, fns, and fne described above may be satisfied in the respective frequency ranges.

In the dust removal apparatus according to the exemplary embodiment of the present invention, with regard to a relationship on the values between the first frequency and the second frequency, the first frequency may be either higher or lower than the second frequency.

Specifically, FIG. 1 illustrates a relationship between the driving frequency and the driving time in which the first frequency is higher than the second frequency as the dust removal apparatus according to the exemplary embodiment of the present invention. In FIG. 1, it suffices when the first frequency $f_1$, the second frequency $f_2$, the frequency fns at which the audible vibration is generated, and the frequency fne at which the audible vibration is ended satisfy a relationship of $f_1 \geq fns > fne \geq f_2$.

Figure 9:
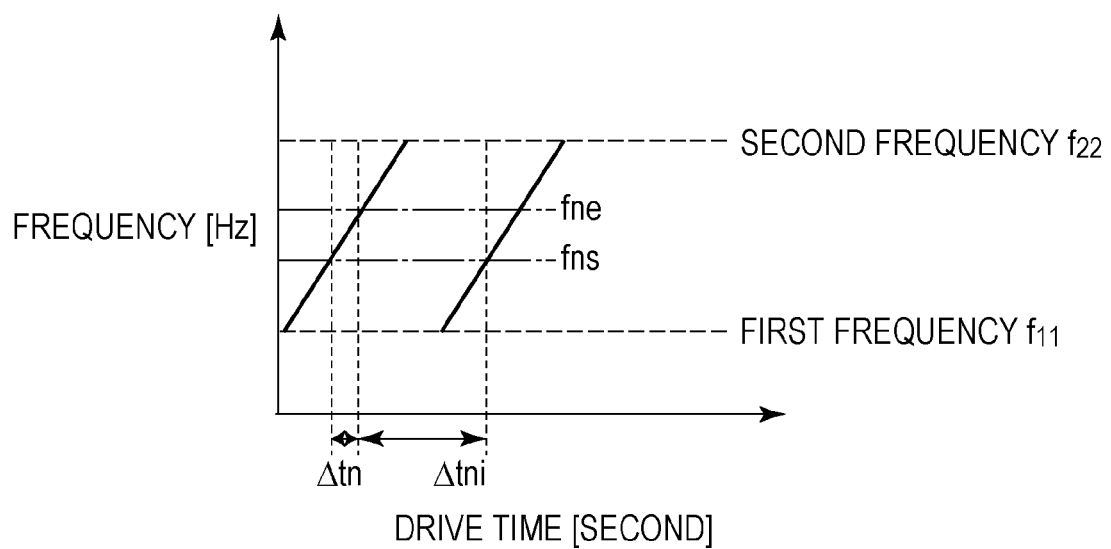
FIG. 9 illustrates a relationship between the driving frequency and the driving time of the dust removal apparatus according to another exemplary embodiment of the present invention.

FIG. 9 illustrates a relationship between the driving frequency and the driving time in which the first frequency is lower than the second frequency as the dust removal apparatus according to another exemplary embodiment of the present invention. In FIG. 9, it suffices when a first frequency $f_{11}$, a second frequency $f_{22}$, the frequency fns at which the audible vibration is generated, and the frequency fne at which the audible vibration is ended satisfy a relationship of $f_{11} \leq fns < fne \leq f_{22}$.

The dust removal apparatus used in the digital single lens reflex camera has been described above as an example of the image pickup apparatus according to the exemplary embodiment of the present invention. However, the apparatus is not necessarily limited to the image pickup apparatus used for the digital camera and may be various image pickup apparatuses and image reading apparatuses such as a digital camcorder, a copier, a facsimile, and a scanner and internal members or parts thereof.

EXAMPLES

Hereinafter, the dust removal apparatus according to the exemplary embodiment of the present invention will be specifically described by way of examples. The examples and a comparison example are carried out in a dust removal apparatus obtained by installing a control circuit (not illustrated) and a power supply (not illustrated) in the image pickup unit 400 illustrated in FIG. 2, but the present invention is not limited to the following examples.

A performance for removing dirt affixed onto the surface of the object side the vibrating plate 410 by way of vibration is referred to as dust removal rate. For example, various sizes and various materials are considered as the dirt affixed onto the digital single lens reflex camera, but representative particles are used to perform the measurement in the examples of the present invention in the following manner.

The dust removal rate is measured in a state in which the control circuit 10 and the power supply 42 are connected to the image pickup unit 400. The dust removal rate is measured in an environment of a room temperature and a humidity at 50% rh, after approximately 500 polystyrene beads (particle diameter: 20 μm to 80 μm) are disseminated over the entirety of the horizontally-disposed vibrating plate 410 and left for 1 minute, the flat surface of the vibrating plate 410 is vertically disposed. In this state, an image of an adhesion state of the polystyrene beads onto the surface of the vibrating plate 410 is picked up by an optical microscope and recorded as a photograph P.

Next, after the vibration is performed, similarly as in the recording of the photograph P, an image of the adhesion state of the polystyrene beads onto the surface of the vibrating plate 410 is picked up by the optical microscope and recorded as a photograph Q.

Next, the number of beads are counted in a range where the light incident on the image pickup element 33 is shielded by the polystyrene beads picked up on the photograph P and the photograph Q are counted and respectively set as bead number P' and the bead number Q', and [(the bead number P'– the bead number Q')/the bead number P']×100 is set as the dust removal rate (in unit of %). When the dust removal rate in the evaluation method according to the examples of the present invention is higher than or equal to 95%, it is possible to obtain a high quality image in which the dust is not picked up on the picked-up image in a general use situation when the dust removal apparatus is installed in the digital single lens reflex camera.

In the measurement for the audible sound, a recording microphone for the measurement is installed 2 cm away from the surface of the vibrating plate 410 in the vertical direction, and recorded data is processed by analysis software to measure the audible sound.

Example 1

The vibrating plate 410 of the dust removal apparatus according to Example 1 is a transparent rectangular parallelepiped birefringent plate formed of crystal having a size of 27.0×38.0×0.6 mm.

Hereinafter, a preparation method for the piezoelectric element 430 according to Example 1 will be described. Barium titanate (prepared by Sakai Chemical Industry Co., Ltd: BT-01) having the average particle diameter of 100 nm, calcium titanate having the average particle diameter of 300 nm (prepared by Sakai Chemical Industry Co., Ltd: CT-03), and calcium zirconate having the average particle diameter of 300 nm (prepared by Sakai Chemical Industry Co., Ltd: CZ-03) corresponding to a raw material are weighed to have a molar ratio of 92.0:2.0:6.0.

Next, these weighed powders are mixed with one another by using a ball mill by way of 24-hour dry blending. To granulate the obtained mixed power, manganese acetate (II) in which Mn weight becomes 0.12 parts by weight in terms of metal with respect to the mixed power and 3 parts by weight of PVA binder with respect to the mixed power are respectively adhered onto the mixed power surface by using a splay dryer apparatus.

Next, the obtained granulated power is filled in a molding, and a compact of 3.3 g/cm$^3$ is prepared by way of application of a compacting pressure at maximum 200 MPa by using a press molding machine. This compact may be further applied with a pressure by using a cold isostatical press molding machine.

Baking is performed under a condition where the obtained compact is heated in an air atmosphere at a rate of temperature increase of 1.0° C./min and held at 600° C. for three hours and is thereafter held at 1350° C. for 5 hours. Accordingly, the piezoelectric material 431 having a composition that can be represented by a chemical formula of Expression (1) is prepared. Next, when the fluorescent X-ray analysis is performed on the piezoelectric material 431, it can be confirmed that this is the composition in which 0.12 parts by weight of Mn in terms of metal is contained with respect to 100 parts by weight of $(Ba_{0.92}Ca_{0.08})(Ti_{0.94}Zr_{0.06})O_3$. Elements other than Ba, Ca, Ti, Zr, and Mn have amounts lower than or equal to detection limits and correspond to 1 parts by weight or lower.

Next, the baked piezoelectric material 431 is substantially uniformly ground to have a thick at 0.25 mm to be subjected to polishing process, and is then cut into dimensions of 26.0 mm×4.0 mm. Thereafter, silver paste is applied to both faces of the piezoelectric material 431 by screen printing, and as illustrated in FIG. 8, the first electrode 432 and the second electrode 433 are formed.

Next, the prepared piezoelectric element 430 is put in a constant temperature bath, and a change of the dielectric constant is measured while the temperature is increased, so that a temperature Tc at which the dielectric constant becomes the local maximum is measured. As a result, the temperature Tc is 110° C. While the piezoelectric element 430 is heated to 100° C. by a hot plate, such that the electric field strength at 1 kV/mm is realized, an electrode 433 is applied with a voltage for 10 minutes by a direct-current power supply to perform the polling treatment, and the piezoelectric element 430 is prepared.

When the dielectric constant is measured by gradually decrease the temperature from 85° C. to −40° C. while the minute AC electric field is applied to the piezoelectric element 430 according to the present exemplary embodiment, the local maximum value of the dielectric constant indicating the phase transition temperature T is 20° C.

In addition, when the Young's modulus $Y_{11}$ of the piezoelectric element is measured while the similar temperature control is performed, the local minimum value is 20° C., and the Young's modulus $Y_{11}$ is changed by 38% in the temperature range between −30° C. and 50° C.

Next, the power feeding line constituted by a flexible cable of the alternating voltage is connected to the prepared piezoelectric element 430 by the ACF. Conditions for a thermal compression bonding apparatus at the time of the connection with the ACF are set as 150° C., 10 seconds, and a pressure at 2 MPa.

Next, the vibrating plate 410 and the first electrode plane of the piezoelectric element 430 are adhered to each other by epoxy system adhesive.

The image pickup unit 400 according to the exemplary embodiment of the present invention is constituted by using the constructed dust removal apparatus.

The frequency of the rectangular-wave alternating voltage is changed every 100 Hz. The temporal frequency change is set to be constant, and the sweep from 190 kHz to 90 kHz is performed.

The piezoelectric element 430 is applied with the rectangular-wave alternating voltage at 50 Vpp via the flexible cable.

First, to find out the driving frequency at which the noise of the audible vibration is generated, the generated noise in the audible range is measured while the frequency sweep from the first frequency to the second frequency is gradually performed.

According to the present example, while the first frequency is set as 190 kHz, and the second frequency is set as 90 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, the frequency fns at which the audible vibration is started to be generated is 135 kHz, and the frequency fne at which the audible vibration is ended is 125 kHz. In addition, the measured noise fh in the audible range is 3 kHz.

In view of the above, the driving for removing the dust is set as follows. The voltage is the rectangular-wave alternating voltage at 50 Vpp. The frequency sweep from 190 kHz to 90 kHz is performed in 100 ms. After the elapse of 100 ms, the frequency sweep from 190 kHz to 90 kHz is performed again. The above-described process is repeated 10 times in total to carry out the driving. At this time, $\Delta tn$ is 10 ms, $\Delta tni$ is 190 ms, and the absolute value of the average speed in $\Delta tn$ is $1.0 \times 10^6$ Hz/second.

The sound pressure level measured at this time is 3 dB, and the dust removal rate is 99.9%.

Example 2

By employing the structural materials and the preparation method similar to those in Example 1, the dust removal apparatus provided with the vibrating plate 410 having the dimensions of 34.0×55.0×0.8 mm and the piezoelectric material 431 having the dimensions of 32.0×3.5 mm and the thickness of 0.20 mm is constructed.

While the first frequency is set as 190 kHz, and the second frequency is set as 90 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 124 kHz, and fne is 123 kHz. In addition, the measured noise fh in the audible range is 500 Hz.

In view of the above, the driving for removing the dust is set as follows. The voltage is the rectangular-wave alternating voltage at 50 Vpp. The frequency sweep from 190 kHz to 90 kHz is performed in 50 ms. After the elapse of 100 ms, the frequency sweep from 190 kHz to 90 kHz is performed again. The above-described process is repeated 16 times in total to carry out the driving. At this time, $\Delta tn$ is 0.5 ms, $\Delta tni$ is 149.5 ms, and the absolute value of the average speed in $\Delta tn$ is $2.0 \times 10^6$ Hz/second.

The sound pressure level measured at this time is 2 dB, and the dust removal rate is 99.9%.

Example 3

By employing the structural materials and the preparation method similar to those in Example 1, the dust removal apparatus provided with the vibrating plate 410 having the dimensions of 27.0×38.0×0.6 mm and the piezoelectric material 431 having the dimensions of 26.0×4.0 mm and the thickness of 0.25 mm is constructed.

While the first frequency is set as 125 kHz, and the second frequency is set as 115 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 121 kHz, and fne is 116 kHz. In addition, the measured noise fh in the audible range is 3 kHz.

In view of the above, the driving for removing the dust is set as follows. The voltage is the rectangular-wave alternating voltage at 50 Vpp. The frequency sweep from 125 kHz to 115 kHz is performed in 10 ms. After the elapse of 5 ms, the frequency sweep from 125 kHz to 115 kHz is performed again. The above-described process is repeated 20 times in total to carry out the driving. At this time, $\Delta tn$ is 5 ms, $\Delta tni$ is 10 ms, and the absolute value of the average speed in $\Delta tn$ is $1.0 \times 10^6$ Hz/second.

The sound pressure level measured at this time is 3 dB, and the dust removal rate is 99.9%.

Example 4

By employing the structural materials and the preparation method similar to those in Example 1, the dust removal apparatus provided with the vibrating plate 410 having the dimensions of 27.0×38.0×0.6 mm and the piezoelectric material 431 having the dimensions of 26.0×4.0 mm and the thickness of 0.25 mm is constructed.

While the first frequency is set as 190 kHz, and the second frequency is set as 70 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 100 kHz, and fne is 90 kHz. In addition, the measured noise fh in the audible range is 3 kHz.

In view of the above, the driving for removing the dust is set as follows. The voltage is the rectangular-wave alternating voltage at 50 Vpp. The frequency sweep from 190 kHz to 70 kHz is performed in 40 ms. After the elapse of 100 ms, the frequency sweep from 190 kHz to 70 kHz is performed again. The above-described process is repeated 25 times in total to carry out the driving. At this time, $\Delta tn$ is 3.3 ms, $\Delta tni$ is 137 ms, and the absolute value of the average speed in $\Delta tn$ is $3.0 \times 10^6$ Hz/second.

The sound pressure level measured at this time is 2 dB, and the dust removal rate is 99.9%.

Example 5

Barium titanate, calcium titanate, and calcium zirconate similar to those in Example 1 are weighed to have a molar ratio of 86.0:8.0:6.0. Furthermore, with respect to 100 parts by weight of the mixed power of these, bismuth oxide (prepared by Japan Pure Chemical Co., Ltd., purity of 99.9% or higher) is weighed such that Bi weight becomes 0.18 parts by weight in terms of metal, and these weighed powders are mixed with each other by using a ball mill by way of 24-hour dry blending. To granulate the obtained mixed power, manganese acetate (II) in which Mn weight becomes 0.14 parts by weight in terms of metal with respect to the mixed power and 3 parts by weight of PVA binder with respect to the mixed power are both adhered onto the mixed power surface by using a splay dryer apparatus.

Next, the obtained granulated power is filled in a molding, and a compact of 3.3 g/cm³ is prepared by way of application of a compacting pressure at maximum 200 MPa by using a press molding machine. This compact may be further applied with a pressure by using a cold isostatical press molding machine.

Baking is performed under a condition where the obtained compact is heated in an air atmosphere at a rate of temperature increase of 1.0° C./min and held at 600° C. for three hours and is thereafter held at 1340° C. for 5 hours. When the fluorescent X-ray analysis is performed, 0.14 parts by weight of Mn in terms of metal and 0.18 parts by weight of Bi in terms of metal are contained with respect to 100 parts by weight of $(Ba_{0.86}Ca_{0.14})(Ti_{0.94}Zr_{0.06})O_3$.

Elements other than Ba, Ca, Ti, Zr, Mn, and Bi have amounts lower than or equal to detection limits and correspond to 1 parts by weight or lower.

When a dielectric constant is measured by gradually decrease the temperature from 85° C. to −40° C. while the minute AC electric field is applied to the piezoelectric element 430 according to the present exemplary embodiment, the local maximum value of the dielectric constant indicating a phase transition temperature Tr is −15° C.

In addition, when the Young's modulus $Y_{11}$ of the piezoelectric element is measured while the similar temperature control is performed, the local minimum value is −15° C., and the Young's modulus $Y_{11}$ is changed by 30% in the temperature range between −30° C. and 50° C.

Next, the dust removal apparatus is constructed from the above-described sintered body by the procedure similar to Example 1.

While the first frequency is set as 190 kHz, and the second frequency is set as 90 kHz, when the frequency sweep from the first frequency to the second frequency is performed in 5 seconds, the noise in the audible range is lower than or equal to the measurement limit in a case where the environment temperature is −20° C. However, when the similar driving is performed at the room temperature (25° C.) environment, fns is 115 kHz, and fne is 110 kHz. In addition, the measured noise fh in the audible range is 3 kHz.

In view of the above, the driving for removing the dust is set as follows. The voltage is the rectangular-wave alternating voltage at 50 Vpp. The frequency sweep from 190 kHz to 90 kHz is performed in 200 ms. After the elapse of 50 ms, the frequency sweep from 190 kHz to 90 kHz is performed again. The above-described process is repeated 5 times in total to carry out the driving. At this time, Δtn is 10 ms, Δtni is 240 ms, and the absolute value of the average speed in Δtn is $5.0 \times 10^5$ Hz/second.

The sound pressure level measured at this time is 3 dB, and the dust removal rate is 99.9%.

Example 6

By employing the structural materials and the preparation method similar to those in Example 1, the dust removal apparatus provided with the vibrating plate 410 having the dimensions of 27.5×40.0×0.6 mm and the piezoelectric material 431 having the dimensions of 27.0×5.6 mm and the thickness of 0.25 mm is constructed.

While the first frequency is set as 122 kHz, and the second frequency is set as 120 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 122 kHz, and fne is 120 kHz. In addition, the measured noise fh in the audible range is 3 kHz.

In view of the above, the driving for removing the dust is set as follows. The voltage is the rectangular-wave alternating voltage at 60 Vpp. The frequency sweep from 122 kHz to 120 kHz is performed in 10 ms. After the elapse of 10 ms, the frequency sweep from 122 kHz to 120 kHz is performed again. The above-described process is repeated 20 times in total to carry out the driving. At this time, Δtn is 10 ms, Δtni is 10 ms, and the absolute value of the average speed in Δtn is $2.0 \times 10^5$ Hz/second.

The sound pressure level measured at this time is 3 dB, and the dust removal rate is 99.9%.

Example 7

By employing the structural materials and the preparation method similar to those in Example 1, the dust removal apparatus provided with the vibrating plate 410 having the dimensions of 27.0×40.0×0.6 mm and the piezoelectric material 431 having the dimensions of 26.0×5.6 mm and the thickness of 0.25 mm is constructed.

While the first frequency is set as 120 kHz, and the second frequency is set as 122 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 120 kHz, and fne is 122 kHz. In addition, the measured noise fh in the audible range is 3 kHz.

In view of the above, the driving for removing the dust is set as follows. The voltage is the rectangular-wave alternating voltage at 60 Vpp. The frequency sweep from 120 kHz to 122 kHz is performed in 10 ms. After the elapse of 10 ms, the frequency sweep from 120 kHz to 122 kHz is performed again. The above-described process is repeated 20 times in total to carry out the driving. At this time, Δtn is 10 ms, Δtni is 10 ms, and the absolute value of the average speed in Δtn is $2.0 \times 10^5$ Hz/second.

The sound pressure level measured at this time is 3 dB, and the dust removal rate is 99.8%.

Example 8

The dust removal apparatus according to Example 1 is constructed, and the image pickup apparatus mounted to the digital single lens reflex camera illustrated in FIGS. 7A and 7B is constructed. The recording microphone for measuring the audible sound is installed 5 cm away from the surface of the vibrating plate 410 in the vertical direction to carry out the evaluation.

First, to find out the driving frequency at which the noise of the audible vibration is generated, the generated noise in the audible range is measured while the frequency sweep from the first frequency to the second frequency is gradually performed.

While the first frequency is set as 190 kHz, and the second frequency is set as 90 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 135 kHz, and fne is 125 kHz. In addition, the measured noise fh in the audible range is 3 kHz.

In view of the above, the driving for removing the dust is set as follows. The voltage is the rectangular-wave alternating voltage at 50 Vpp. The frequency sweep from 190 kHz to 90 kHz is performed in 100 ms. After the elapse of 100 ms, the frequency sweep from 190 kHz to 90 kHz is performed again. The above-described process is repeated 10 times in total to carry out the driving. At this time, $\Delta$tn is 10 ms, $\Delta$tni is 190 ms, and the absolute value of the average speed in $\Delta$tn is $1.0\times10^6$ Hz/second.

The sound pressure level measured at this time is 3 dB, and the dust removal rate is 99.9%.

Example 9

By employing the structural materials and the preparation method similar to those in Example 1, the dust removal apparatus provided with the vibrating plate 410 having the dimensions of 34.0×55.0×0.5 mm and the piezoelectric material 431 having the dimensions of 32.0×3.5 mm and the thickness of 0.25 mm is constructed.

First, to find out the driving frequency at which the noise of the audible vibration is generated, the generated noise in the audible range is measured while the frequency sweep from the first frequency to the second frequency is gradually performed.

While the first frequency is set as 160 kHz, and the second frequency is set as 90 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 100 kHz, and fne is 98 kHz. In addition, the measured noise fh in the audible range is 0.5 kHz.

In view of the above, the driving for removing the dust is set as follows. The voltage is the rectangular-wave alternating voltage at 50 Vpp. The frequency sweep from 160 kHz to 90 kHz is performed in 50 ms. After the elapse of 10 ms, the frequency sweep from 160 kHz to 90 kHz is performed again. The above-described process is repeated 4 times in total to carry out the driving. At this time, $\Delta$tn is 1.4 ms, $\Delta$tni is 58.6 ms, and the absolute value of the average speed in $\Delta$tn is $1.4\times10^6$ Hz/second.

The sound pressure level measured at this time is 2 dB, and the dust removal rate is 99.9%.

Example 10

By employing the structural materials and the preparation method similar to those in Example 1, the dust removal apparatus provided with the vibrating plate 410 having the dimensions of 34.0×55.0×0.7 mm and the piezoelectric material 431 having the dimensions of 32.0×3.8 mm and the thickness of 0.22 mm is constructed.

First, to find out the driving frequency at which the noise of the audible vibration is generated, the generated noise in the audible range is measured while the frequency sweep from the first frequency to the second frequency is gradually performed.

While the first frequency is set as 130 kHz, and the second frequency is set as 90 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 94 kHz, and fne is 92 kHz. In addition, the measured noise fh in the audible range is 0.5 kHz.

In view of the above, the driving for removing the dust is set as follows. The voltage is the rectangular-wave alternating voltage at 50 Vpp. The frequency sweep from 130 kHz to 90 kHz is performed in 100 ms. After the elapse of 100 ms, the frequency sweep from 130 kHz to 90 kHz is performed again. The above-described process is repeated 4 times in total to carry out the driving. At this time, $\Delta$tn is 5.0 ms, $\Delta$tni is 195.0 ms, and the absolute value of the average speed in $\Delta$tn is $4.0\times10^5$ Hz/second.

The sound pressure level measured at this time is 2 dB, and the dust removal rate is 99.9%.

Example 11

By employing the structural materials and the preparation method similar to those in Example 1, the dust removal apparatus provided with the vibrating plate 410 having the dimensions of 34.0×55.0×0.8 mm and the piezoelectric material 431 having the dimensions of 32.0×4.2 mm and the thickness of 0.22 mm is constructed.

First, to find out the driving frequency at which the noise of the audible vibration is generated, the generated noise in the audible range is measured while the frequency sweep from the first frequency to the second frequency is gradually performed.

While the first frequency is set as 160 kHz, and the second frequency is set as 90 kHz, when the frequency sweep from the first frequency to the second frequency is performed in 5 seconds, the noise in the audible range is lower than or equal to the measurement limit in a case where the environment temperature is 40° C. However, when the similar driving is performed at the room temperature (25° C.) environment, fns is 142 kHz, and fne is 141 kHz. In addition, the measured noise fh in the audible range is 0.5 kHz.

In view of the above, the driving for removing the dust is set as follows. The voltage is the rectangular-wave alternating voltage at 50 Vpp. The frequency sweep from 160 kHz to 90 kHz is performed in 100 ms. After the elapse of 100 ms, the frequency sweep from 160 kHz to 90 kHz is performed again. The above-described process is repeated 4 times in total to carry out the driving. At this time, $\Delta$tn is 1.4 ms, $\Delta$tni is 198.6 ms, and the absolute value of the average speed in $\Delta$tn is $7.0\times10^5$ Hz/second.

The sound pressure level measured at this time is 2 dB, and the dust removal rate is 99.9%.

Example 12

By preparing a material by adding 2000 ppm of lead to the composition of the piezoelectric material according to Example 1 and employing the preparation method similar to those in Example 1, the dust removal apparatus provided with the vibrating plate 410 having the dimensions of 34.0×55.0× 0.8 mm and the piezoelectric material 431 having the dimensions of 32.0×4.2 mm and the thickness of 0.22 mm is constructed.

The first frequency is set as 190 kHz, and the second frequency is set as 90 kHz. When the frequency sweep from the first frequency to the second frequency is performed in 5 seconds, the noise in the audible range is lower than or equal to the measurement limit in a case where the environment temperature is 40° C.

When the similar driving is performed at the room temperature (25° C.) environment, the frequency fns at which the audible vibration is started to be generated is 135 kHz, and the frequency fne at which the audible vibration is ended is 125 kHz. In addition, the measured noise fh in the audible range is 3 kHz.

The driving for removing the dust is set as follows. The voltage is the rectangular-wave alternating voltage at 50 Vpp. The frequency sweep from 190 kHz to 90 kHz is performed in 100 ms. After the elapse of 100 ms, the frequency sweep from 190 kHz to 90 kHz is performed again. The above-described process is repeated 10 times in total to carry out the driving. At this time, $\Delta tn$ is 10 ms, $\Delta tni$ is 190 ms, and the absolute value of the average speed in $\Delta tn$ is $1.0 \times 10^6$ Hz-second.

The sound pressure level measured at this time is 5 dB, and the dust removal rate is 99.9%.

Comparison Example 1

In the dust removal apparatus having the configuration according to Example 1, the driving for removing the dust is set as follows. The voltage is the rectangular-wave alternating voltage at 50 Vpp. The frequency sweep from 190 kHz to 90 kHz is performed in 1000 ms. After the elapse of 100 ms, the frequency sweep from 190 kHz to 90 kHz is performed again. The above-described process is repeated 4 times in total to carry out the driving. At this time, $\Delta tn$ is 100 ms, $\Delta tni$ is 1000 ms, and the absolute value of the average speed in $\Delta tn$ is $1.0 \times 10^5$ Hz/second.

The sound pressure level measured at this time is 22 dB, and the dust removal rate is 99.9%.

TABLE 1

| | Ex. 1 | Ex. 2 | Ex. 3 | Ex. 4 | Ex. 5 | Ex. 6 | Ex. 7 |
|---|---|---|---|---|---|---|---|
| Material constituent elements | Ba, Ca, Ti, Zr, Mn, O | Ba, Ca, Ti, Zr, Mn, O | Ba, Ca, Ti, Zr, Mn, O | Ba, Ca, Ti, Zr, Mn, O | Ba, Ca, Ti, Zr, Mn, Bi | Ba, Ca, Ti, Zr, Mn, O | Ba, Ca, Ti, Zr, Mn, O |
| First crystal phase | ferroelectric crystal phase | ferroelectric crystal phase | ferroelectric crystal phase | ferroelectric crystal phase | ferroelectric crystal phase | ferroelectric crystal phase | ferroelectric crystal phase |
| Second crystal phase | ferroelectric crystal phase | ferroelectric crystal phase | ferroelectric crystal phase | ferroelectric crystal phase | ferroelectric crystal phase | ferroelectric crystal phase | ferroelectric crystal phase |
| Lead content | Less than 1000 ppm | Less than 1000 ppm | Less than 1000 ppm | Less than 1000 ppm | Less than 1000 ppm | Less than 1000 ppm | Less than 1000 ppm |
| Piezoelectric material phase transition temperature T [° C.] | 20 | 20 | 20 | 20 | −40 | 20 | 20 |
| First frequency [kHz] | 190 | 190 | 125 | 190 | 190 | 122 | 120 |
| Second frequency [kHz] | 90 | 90 | 115 | 70 | 90 | 120 | 122 |
| fns [kHz] | 135 | 124 | 121 | 100 | 115 | 122 | 120 |
| fne [kHz] | 125 | 123 | 116 | 90 | 110 | 120 | 122 |
| Speed average absolute value [Hz/sec] | $1 \times 10^6$ | $2 \times 10^6$ | $1 \times 10^6$ | $3 \times 10^6$ | $5 \times 10^5$ | $2 \times 10^5$ | $2 \times 10^5$ |
| fh [kHz] | 3 | 0.5 | 3 | 3 | 3 | 3 | 3 |
| 1/fh [ms] | 0.33 | 2.00 | 0.33 | 0.33 | 0.33 | 0.33 | 0.33 |
| $\Delta tn$ [ms] | 10.0 | 0.5 | 5.0 | 3.3 | 10.0 | 10.0 | 10.0 |
| $\Delta tni$ [ms] | 190.0 | 149.5 | 10.0 | 136.7 | 240.0 | 10.0 | 10.0 |
| Sound pressure level [dB] | 3 | 2 | 3 | 2 | 3 | 3 | 3 |
| Dust removal rate [%] | 99.9 | 99.9 | 99.9 | 99.9 | 99.9 | 99.9 | 99.8 |

| | Ex. 8 | Ex. 9 | Ex. 10 | Ex. 11 | Ex. 12 | Comp. Ex. 1 |
|---|---|---|---|---|---|---|
| Material constituent elements | Ba, Ca, Ti, Zr, Mn, O | Ba, Ca, Ti, Zr, Mn, O | Ba, Ca, Ti, Zr, Mn, O | Ba, Ca, Ti, Zr, Mn, O | Ba, Ca, Ti, Zr, Mn, O, Pb | Ba, Ca, Ti, Zr, Mn, O |
| First crystal phase | ferroelectric crystal phase | ferroelectric crystal phase | ferroelectric crystal phase | ferroelectric crystal phase | ferroelectric crystal phase | ferroelectric crystal phase |
| Second crystal phase | ferroelectric crystal phase | ferroelectric crystal phase | ferroelectric crystal phase | ferroelectric crystal phase | ferroelectric crystal phase | ferroelectric crystal phase |

TABLE 1-continued

| Lead content | Less than 1000 ppm | Less than 1000 ppm | Less than 1000 ppm | Less than 1000 ppm | 2000 ppm | Less than 1000 ppm |
|---|---|---|---|---|---|---|
| Piezoelectric material phase transition temperature T [° C.] | 20 | 20 | 20 | 20 | 17 | 20 |
| First frequency [kHz] | 190 | 160 | 130 | 160 | 190 | 190 |
| Second frequency [kHz] | 90 | 90 | 90 | 90 | 90 | 90 |
| fns [kHz] | 135 | 100 | 94 | 142 | 135 | 135 |
| fne [kHz] | 125 | 98 | 92 | 141 | 125 | 125 |
| Speed average absolute value [Hz/sec] | $1 \times 10^6$ | $1 \times 10^6$ | $4 \times 10^5$ | $7 \times 10^5$ | $1 \times 10^6$ | $1 \times 10^5$ |
| fh [kHz] | 3 | 0.5 | 0.5 | 0.5 | 3 | 3 |
| 1/fh [ms] | 0.33 | 2.00 | 2.00 | 2.00 | 0.33 | 0.33 |
| Δtn [ms] | 10.0 | 1.4 | 5.0 | 1.4 | 10.0 | 100.0 |
| Δtni [ms] | 190.0 | 58.6 | 195.0 | 198.6 | 190.0 | 1000.0 |
| Sound pressure level [dB] | 3 | 2 | 2 | 2 | 5 | 22 |
| Dust removal rate [%] | 99.9 | 99.9 | 99.9 | 99.9 | 99.9 | 99.9 |

Since the dust removal apparatus according to the exemplary embodiment of the present invention can remove the foreign substance such as the dust attached onto the surface of the vibrating plate, the dust removal apparatus can also be applied to various image pickup apparatuses such as a digital camcorder, a copier, a facsimile, and a scanner.

According to the exemplified embodiment of the present invention, it is possible to provide the dust removal apparatus that has the excellent dust removal performance and also avoids the generation of the audible sound and the image pickup apparatus using the dust removal apparatus with which the satisfactory image pickup can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086678, filed Apr. 18, 2014, which is hereby incorporated by reference herein in its entirety.

What is claimed is:

1. A dust removal apparatus comprising:
a vibrating plate;
at least one piezoelectric element provided on a surface of the vibrating plate;
a power supply that applies the piezoelectric element with an alternating voltage; and
a control circuit that changes a frequency of the alternating voltage,
wherein the piezoelectric element includes at least a first electrode, a piezoelectric material, and a second electrode,
wherein a phase transition temperature T from a first crystal phase to a second crystal phase of the piezoelectric material is in a range of $-40°$ C.$\leq T \leq 85°$ C.,
wherein the change of the frequency is a change for repeating a frequency sweep operation from a first frequency to a second frequency, and
wherein, when a frequency at which an audible vibration is generated during the sweep operation is set as fns, a frequency at which the audible vibration is ended is set as fne, and a changing time from the frequency fns to the frequency fne during the sweep operation is set as Δtn, a relationship of Δtn≤10 ms is satisfied.

2. The dust removal apparatus according to claim 1, wherein a changing speed Vf of the audible vibration during the sweep operation in the changing time Δtn is represented by |fns−fne|/Δtn, and the changing speed Vf of the audible vibration is higher than or equal to $5 \times 10^5$ Hz/second and lower than or equal to $3 \times 10^6$ Hz/second.

3. The dust removal apparatus according to claim 1, wherein a vibration frequency of an acoustic wave of audible sound generated during a period from the generation to the end of the audible vibration in the changing time Δtn is set as fh, a relationship of Δtn≤1/fh is satisfied.

4. The dust removal apparatus according to claim 1, wherein, when a time from the end of the audible vibration in the time change Δtn until when a frequency of a subsequently generated audible vibration becomes fns is set as Δtni, a relationship of Δtni≥2Δtn is satisfied.

5. The dust removal apparatus according to claim 1, wherein the first frequency is higher than the second frequency.

6. The dust removal apparatus according to claim 1, wherein, when the first frequency is set as $f_1$, the second frequency is set as $f_2$, the frequency at which the audible vibration is generated is set as fns, and the frequency at which the audible vibration is ended is set as fne, a relationship of $f_1 \geq fns > fne \geq f_2$ is satisfied.

7. The dust removal apparatus according to claim 1, wherein, when the first frequency is set as $f_{11}$, the second frequency is set as $f_{22}$, the frequency at which the audible vibration is generated is set as fns, and the frequency at which the audible vibration is ended is set as fne, a relationship of $f_{11} \leq fns < fne \leq f_{22}$ is satisfied.

8. The dust removal apparatus according to claim 1, wherein the first crystal phase and the second crystal phase of the piezoelectric material are both a ferroelectric crystal phase.

9. The dust removal apparatus according to claim 1, wherein a content of lead in the piezoelectric material is lower than 1000 ppm.

10. The dust removal apparatus according to claim 1,
wherein the piezoelectric material contains a perovskite type metal oxide represented by a general formula (1) as a main component:

$$(Ba_{1-x}Ca_x)_a(Ti_{1-y}Zr_y)O_3 (1.00 \leq a \leq 1.02, 0.02 \leq x \leq 0.30, 0.020 \leq y \leq 0.095) \quad (1),\text{ and}$$

wherein the metal oxide contains Mn, and a content of Mn in the metal oxide is 0.02 parts by weight or higher and 0.40 parts by weight or lower in terms of metal with respect to 100 parts by weight of the metal oxide.

11. An image pickup apparatus comprising at least:
the dust removal apparatus according to claim 1; and
an image pickup unit,
wherein the vibrating plate of the dust removal apparatus is provided on a light reception surface side of the image pickup unit.

\* \* \* \* \*